Sept. 3, 1940.  W. J. NAPAVANCE  2,213,368
ICE CREAM FREEZER
Filed March 14, 1938  2 Sheets-Sheet 1

FIG. I.

WILLIAM J. NAPAVANCE
INVENTOR.

BY *Snow & Geo.*
ATTORNEYS.

Sept. 3, 1940. W. J. NAPAVANCE 2,213,368
ICE CREAM FREEZER
Filed March 14, 1938 2 Sheets-Sheet 2

WILLIAM J. NAPAVANCE
INVENTOR.

BY C.A.Snow&Co.

ATTORNEYS.

Patented Sept. 3, 1940

2,213,368

UNITED STATES PATENT OFFICE 2,213,368

ICE CREAM FREEZER

William J. Napavance, St. Cloud, Minn.

Application March 14, 1938, Serial No. 195,883

2 Claims. (Cl. 62—114)

This invention relates to ice cream freezers and is designed more especially for use in connection with the evaporator of the refrigerating unit of a gas or electric refrigerator, one of the objects being to provide a container for brine or other suitable circulating medium adapted to be maintained at a low temperature by the evaporator of the freezing unit in the refrigerator and which container is in communication with the interior of a housing in which is located a motor driven ice cream freezer mechanism whereby it becomes possible to produce ice cream by the aid of brine of a low temperature instead of utilizing ice or coils, as heretofore.

A further object is to provide an ice cream freezer which can be made as an integral part of the evaporator of a refrigerator or can be constructed as an accessory to be combined with the evaporator.

A still further object is to produce a freezer of this type which, when in position, will not interfere with the closing of the refrigerator door.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1:
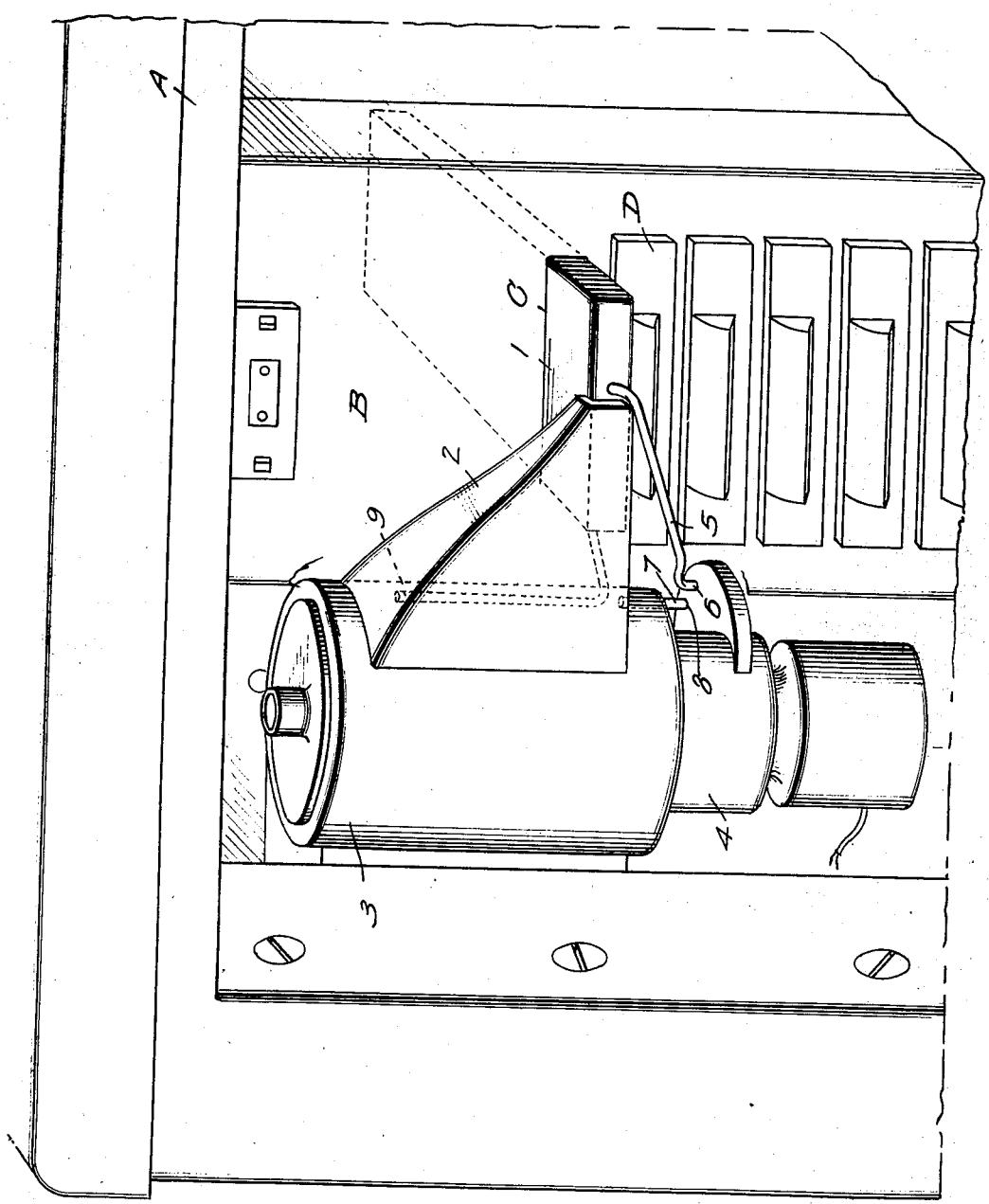
Figure 1 is a perspective view of a portion of the interior of a mechanical refrigerator showing the present improvements combined therewith.
Figure 2:
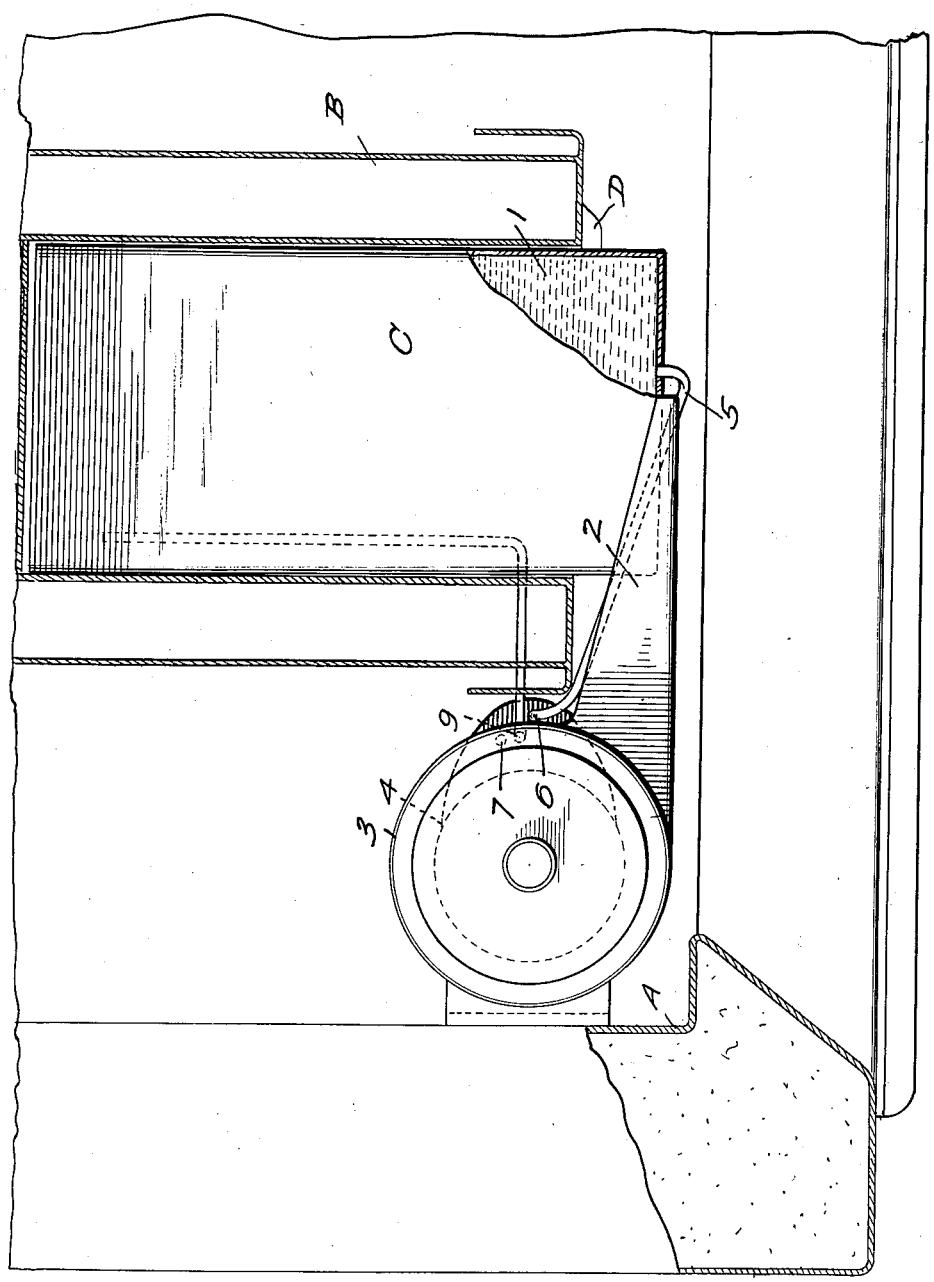
Figure 2 is a view partly in plan and partly in section showing the structure disclosed in Figure 1.

Referring to the figures by characters of reference A designates a refrigerator structure containing a refrigerating unit the evaporator B of which, in the form shown, is provided with the usual spaces or recesses C for the reception of ice trays D.

The device constituting the present invention includes a sealed tank 1 so proportioned as to be received by one of the pockets C after a tray has been removed therefrom and this tank is adapted to project a short distance from the evaporator B. The projecting end of the tank has an integral bracket 2 extended laterally therefrom and joined to the insulated housing 3 of the ice cream freezer which latter, with bracket 2, is thus supported by tank 1 with all portions outside of the evaporator, where the mechanism of the freezer is accessible at all times without removing the tank. At the bottom of this housing 5 is located a pump casing 4 to which extends a feed pipe 5 leading from tank 1 to the inlet 6 of the pump housing. An outflow pipe 7 extends from the outlet 8 of the pump housing into the bottom portion of the freezer casing 3. A return pipe 9 is located within the casing 3 close to the insulated wall thereof and has its upper open end located near the top of casing 3 while the lower end thereof is extended outwardly from the bottom portion of the casing to the tank 1.

The mechanisms of the pump and of the freezer and the motor or other means for operating them constitute no part of the present invention and have not been shown.

In practice the tank 1 is filled with brine and the brine also extends to a predetermined level within the housing 3. The mixture from which ice cream is to be made is placed in the housing 3 and agitated in any preferred manner. Means for this purpose can be found in many patents as well as in articles now on the market. After the freezer has been filled and closed the tank 1 is inserted into the selected recess C and will thus act to support the parts connected to the tank. As the bracket 2 is extended laterally from tank 1, none of the parts carried thereby will be located where they will interfere with the proper closing of the door of the refrigerator.

Obviously the brine in the tank 1 will be quickly lowered in temperature by the evaporator B and when the freezer mechanism is started, this chilled brine will be circulated through housing 3 by way of pipes 5, 7 and 9, the circulation being made positive by the use of the pump in housing 4. During the circulation of the brine the consistency of the ice cream mixture will gradually be increased until it has obtained the ultimate condition desired. Thereafter the structure can be removed from the refrigerator and the ice cream removed.

Obviously instead of utilizing a tank 1 which is a separate unit for insertion into the evaporator, said unit can be made an integral part of the evaporator and the other parts of the invention can be attachable to the tank or can be retained as an integral part thereof as shown.

What is claimed is:

1. An attachment for the evaporator of a mechanical refrigerator, including a brine tank proportioned for insertion into a tray receiving space within the evaporator, an ice cream freezer connected to and supported by one end of said tank, and means for circulating brine between the tank and freezer.

2. The combination with the evaporator of a mechanical refrigerator, of a brine tank subjected to the action of the evaporator, an ice cream freezer connected to the tank and supported entirely outside of the evaporator, and means for circulating brine between the tank and ice cream freezer.

WILLIAM J. NAPAVANCE.